A. VANDERVELD.
MEASURING AND COMPUTING MACHINE.
APPLICATION FILED JAN. 28, 1921.

1,420,612.

Patented June 20, 1922.
8 SHEETS—SHEET 1.

Inventor
ANTHONY VANDERVELD
By Frank E. Liverance, Jr.
Attorney

A. VANDERVELD.
MEASURING AND COMPUTING MACHINE.
APPLICATION FILED JAN. 28, 1921.

1,420,612. Patented June 20, 1922.
8 SHEETS—SHEET 2.

Inventor
ANTHONY VANDERVELD
By Frank E. Liverance, Jr.
Attorney

Inventor
ANTHONY VANDERVELD.
By Frank E. Liverance, Jr.
Attorney

A. VANDERVELD.
MEASURING AND COMPUTING MACHINE.
APPLICATION FILED JAN. 28, 1921.

1,420,612.

Patented June 20, 1922.
8 SHEETS—SHEET 4.

Inventor
ANTHONY VANDERVELD.
By Frank E. Liverance, Jr.
Attorney

A. VANDERVELD.
MEASURING AND COMPUTING MACHINE.
APPLICATION FILED JAN. 28, 1921.

1,420,612.

Patented June 20, 1922.
8 SHEETS—SHEET 6.

Inventor
ANTHONY VANDERVELD.
By Frank E. Liverance, Jr.
Attorney

A. VANDERVELD.
MEASURING AND COMPUTING MACHINE.
APPLICATION FILED JAN. 28, 1921.

1,420,612.

Patented June 20, 1922.
8 SHEETS—SHEET 8.

Inventor
ANTHONY VANDERVELD.
By Frank E. Liverance, Jr
Attorney

UNITED STATES PATENT OFFICE.

ANTHONY VANDERVELD, OF GRAND RAPIDS, MICHIGAN, ASSIGNOR OF ONE-HALF TO STEPHEN E. PARRISH, OF GRAND RAPIDS, MICHIGAN.

MEASURING AND COMPUTING MACHINE.

1,420,612.  Specification of Letters Patent.  Patented June 20, 1922.

Application filed January 28, 1921. Serial No. 440,578.

*To all whom it may concern:*

Be it known that I, ANTHONY VANDERVELD, a citizen of the United States of America, residing at Grand Rapids, in the county of Kent and State of Michigan, have invented certain new and useful Improvements in Measuring and Computing Machines; and I do hereby declare the following to be a full, clear, and exact description of the invention, such as will enable others skilled in the art to which it appertains to make and use the same.

This invention relates to a measuring and computing machine in which ribbon, cloth or like merchandise may be readily measured as it is drawn through the machine, and at the same time a price scale for the amount measured brought to view on which the value of the length measured at a plurality of prices per unit of length is calculated, it being necessary only to select the computation relating to the particular price per unit of measurement for the goods measured to at once know what the value of the amount measured is. The operation of the measuring mechanism and of the price scale is simultaneous and synchronous, the computations on the scale showing being, at all times, directly relative to the amount of goods passed through the machine. It is a primary object and purpose of the invention to make a machine of this character, in which the number of parts going to make up the machine is held to a minimum, thereby tending to economy of manufacture and simplicity of construction, and at the same time so construct the machine that the number of yards or fractions thereof is visible both to the clerk performing the operation of the machine and to the customer buying the goods. A further object of the invention is to make the machine of compact construction and automatically operable to stop its functioning when a certain predetermined amount of the goods has been passed therethrough, through a brake action against the goods which prevents further movement of the goods through the machine, this being for the purpose of safeguarding the machine against attempted operation beyond the limits for which it is designed. Many other objects and purposes than those stated, including novel provisions for maintaining the machine in any position to which operated, a novel means for releasing the same for return to initial position with novel safeguarding means for taking the shock or momentum of the moving parts of the machine as they are brought to a stop and novel constructions for bringing the goods passed through the machine against the measuring roller operated thereby as it passes through the machine, will appear as understanding of the invention is had from the following description, taken in connection with the accompanying drawings, in which.

Like reference characters refer to like parts in the different figures of the drawings.

Figure 13:
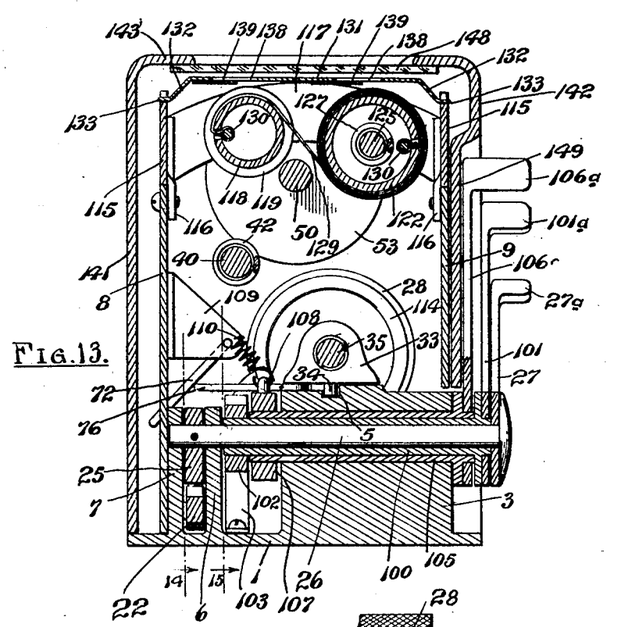
Fig. 13 is a vertical transverse section on the plane of line 13—13, of Fig. 4.
Figure 18:
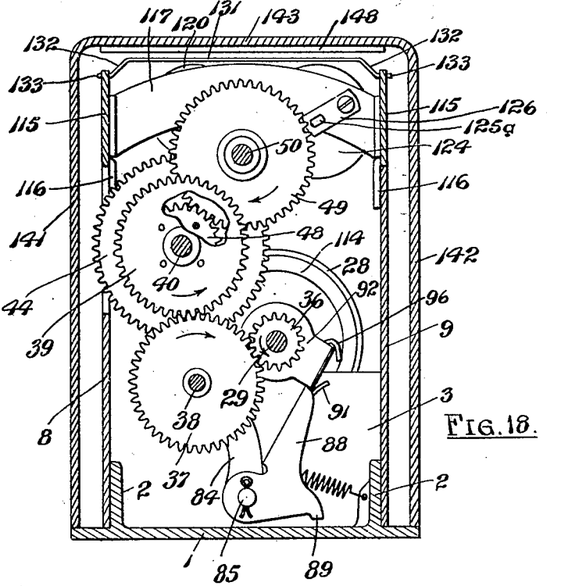
Fig. 18 is a vertical transverse section on the plane of line 18—18, of Fig. 4.

In the construction of the machine, a base 1, rectangular in outline is used from which a short distance inward from its edges vertical flange members 2 extend, (Figs 4 and 18) being cast integral therewith. An upwardly projecting supporting block 3 is also cast with the base which, at its upper end is formed with a forwardly extending arm 4 (Figs. 4 and 9) in which and the upper side of the support 3, a guide groove or slot 5 is cut. Toward the rear side of the machine two upright lugs 6 and 7 (Fig. 13) are provided, the latter projecting upwardly from flange 2 and the former from the base 1, being spaced apart from each other and the lug 6 being spaced a short distance from the end of the block 3.

Figure 4:
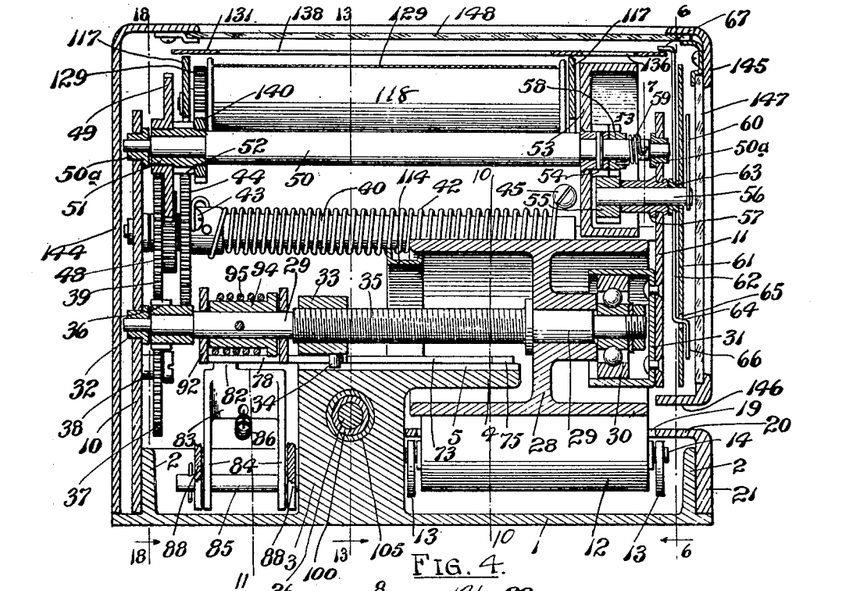
Fig. 4 is a longitudinal vertical section taken through the machine on a plane including the axis of the measuring roller.
Figure 10:
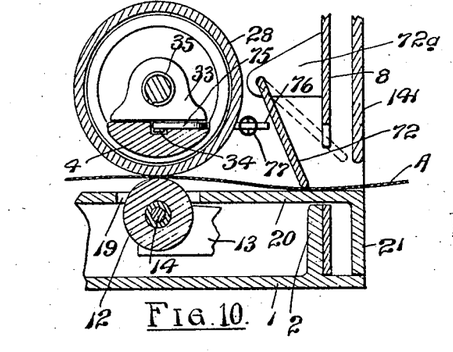
Fig. 10 is a fragmentary transverse vertical section taken through the mechanism shown in Fig. 9, the section being taken substantially on the plane of line 10—10, of Fig. 4.

Two rear and front side plates 8 and 9 (Fig. 18) are connected at their lower portions to the flanges 2 and extend upwardly therefrom. A rear end plate 10 and front end plate 11 (Fig. 4) are disposed between the side plates 8 and 9, the front end plate extending but part way to the base 1 while the rear end plate 10 is connected to the rear end flange 2, as shown in Fig. 4. A presser roller 12, preferably, rubber covered is mounted in front of the supporting block 3, being carried by and between the ends of two levers 13, located in spaced apart relation, the roller having end pintles 14 which pass through suitable openings in the levers. Levers 13 are pivotally mounted on a rod 15 Fig. 6, a sleeve 16 passing over the rod and connecting the arms together so that they move together. A coiled spring 17 is located around the sleeve 16, one end thereof seating in a notch 18 made in the upper side of the rear end of the inner lever 13 while the opposite end of the spring coil bears against the base 1, whereby the spring has a tendency to elevate the roller 12 when free to do so. Said roller 12 is located so as to extend through an opening 19 made in the plate 20 (Figs. 6 and 10) positioned horizontally over the front portion of the base 1, the plate having downwardly extending integral flanges 21 adapted to come against the front end flange 2 and connect thereto. The presser roller mechanism is covered by plate 20 except where roller 12 comes therethrough and the goods measured in the machine pass over said plate and roller, as will be later described.

Figure 14:
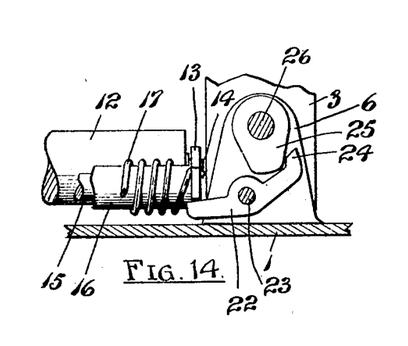
Fig. 14 is a sectional elevation on the plane of line 14 of Fig. 13.

A lever 22 (see Fig. 14) is pivotally mounted between its ends on a pivot 23 disposed between lug 6 and the adjacent flange 2, one end of the lever coming under the rear end of the inner arm of lever 13. The opposite end of the lever is formed with a short upwardly extending finger 24 against and over which a cam 25 attached to a horizontal rod 26 is designed to ride on turning the rod. This rod or shaft 26, mounted at its rear end in lug 7 passes forwardly through lug 6 and through the block 3 to the front of the machine (Fig. 13), being equipped with an operating lever 27 at its front end which has an outturned finger engaging lip at its free end whereby the lever and attached parts may be manually operated. By moving the lever to lower position, cam 25 acts on finger 24 to move roller 12 to a lower position. The outer end of the cam riding over the finger 24 serves to hold the parts in such position until the lever is moved in the reverse direction to free the roller for return to its normal upper position.

Directly over the presser roller, a measuring roller 28 is mounted for rotation, being fixed to an arbor 29, the front end of which is rotatably mounted in a bearing 30 (Fig. 4) carried in a cup shaped bearing retainer attached to the rear side of the plate 11, while its rear end is mounted rotatably in a bearing 32 carried by the rear end plate 10. The outer surface of roller 28 is knurled or otherwise roughened and the presser roller normally bears against the under side thereof or against goods interposed between the two rollers.

A nut 33 is mounted on the intermediate portion of the arbor which is threaded to carry the nut as indicated at 35. A pin 34 extends from the nut into the groove 5 heretofore described. The under side of the nut is flat to ride over the flat upper surface of block 3 and its extended arm 4, it being evident that with the rotation of the measuring roller and attached arbor, the nut traverses the threaded portion of the arbor.

A pinion 36 is attached near the rear end of arbor 29 and is in mesh with an idle gear 37 mounted on a stud 38 carried by plate 10 (Figs. 4 and 18) which in turn meshes with a gear 39 loosely mounted around a shaft 40 disposed horizontally above and back of the arbor shaft 29 and mounted at its ends in suitable bearings 41 (Fig. 19) carried in plates 10 and 11. A spring 42 is coiled around the shaft and is attached at one end at 43 to a gear 44 pinned to the shaft and at its other end at 45 to a suitable stationary part of the machine. This spring is normally under tension and has a tendency to turn the gear 44 and attached shaft in one direction. At its front end, in front of the plate 11 (see Fig. 19), the shaft 40 is provided with a small disk 46 from which four equally spaced pins 47 (Fig. 6) project in a forward direction.

Figure 19:
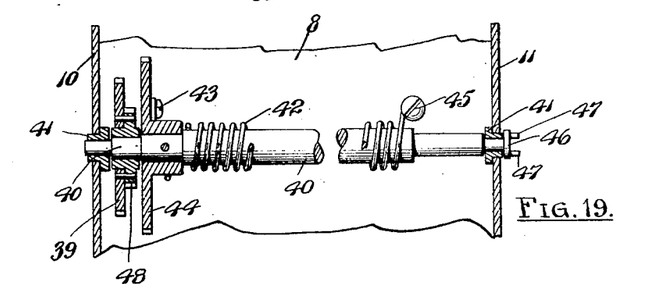
Fig. 19 is a fragmentary longitudinal vertical section, showing the spring motor shaft of the machine.
Figure 20:
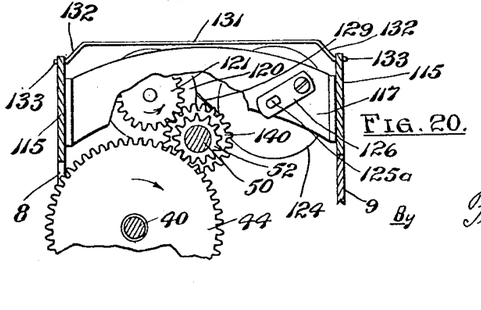
Fig. 20 is a fragmentary transverse vertical section through the machine a short distance in front of the plane of line 18—18, of Fig. 4.
Figure 21:
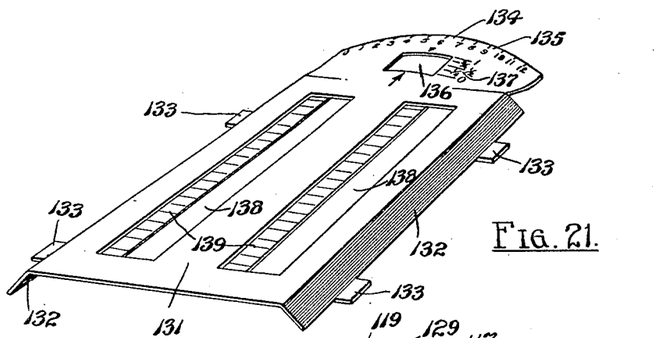
Fig. 21 is a perspective view of the upper cover plate for the price indicating mechanism.

A smaller gear 48 is connected to gear 39 as shown in Fig. 19 and is in mesh with a gear 49 (Fig. 18) fixed to a horizontal shaft 50 mounted above arbor shaft 29 and the spring motor shaft 40. This shaft 50 is mounted at its ends in suitable bearings 50ª (Fig. 4) carried by plates 10 and 11. The gear 49 is connected to a sleeve 51 secured on shaft 50 on which a pinion 52 is cut in front of gear 49 and which is in engagement with the gear 44. It is evident that the drive of the shafts is through gears and pinions 36, 37, 39, 48 and 49 to the shaft 50, and back from said shaft 50 through pinion 52 and gear 44 to shaft 40. The size of the roller 28 is such and the gearing is so designed that when one yard of ribbon or similar goods is drawn through between the rollers 12 and 28, shaft 50 makes one complete revolution and no more.

A cup-shaped indicating member 53 is attached to a compound sleeve and pinion 54 pinned to the shaft 50 near its front end on which member a consecutive series of indicating characters are printed or otherwise placed entirely around the same, and indicating fractional parts of a yard. Pinion 54 meshes with a wider pinion 55 located below it and attached at the rear end of a short shaft 56 mounted for rotation in a bearing sleeve 57 which is secured to and extends rearwardly from the plate 11. The pinions 54 and 55 have the same pitch and the same number of teeth. A third pinion 58 having the same number of teeth is loosely mounted on shaft 50 in front of pinion 54, being flexibly attached to the shaft by a spring 59 connected at its ends to the shaft and pinion, this serving to overcome any lost motion or looseness between the pinions 54 and 55 and causing a sure, even and positive drive of the shaft 56. On the front end of shaft 56 an indicating hand or arrow 60 is secured which is adapted to move over a plate 61 located in front of the plate 11, the hand making one complete revolution as each yard of goods is passed for measurement through the machine.

Figure 6:
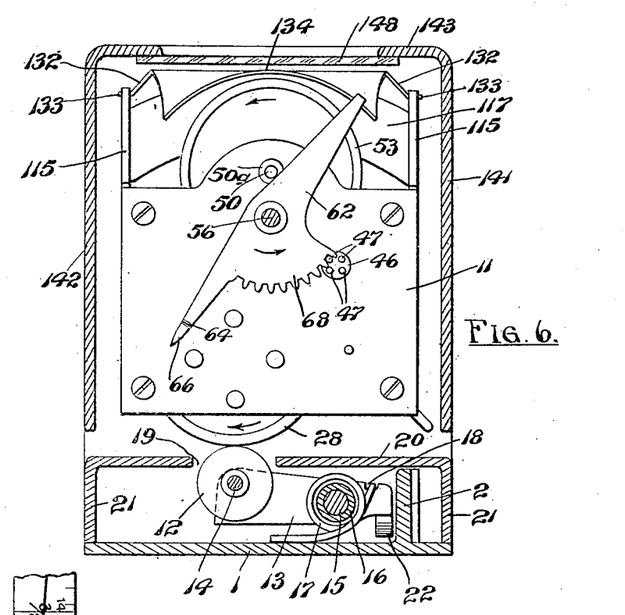
Fig. 6 is a vertical transverse section on the plane of line 6—6, of Fig. 4.
Figure 7:
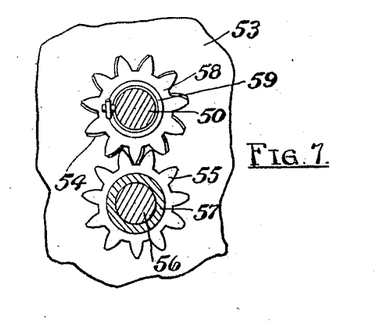
Fig. 7 is a similar section on line 7 of Fig. 4 and showing a fragmentary portion of the machine at said section.
Figure 8:
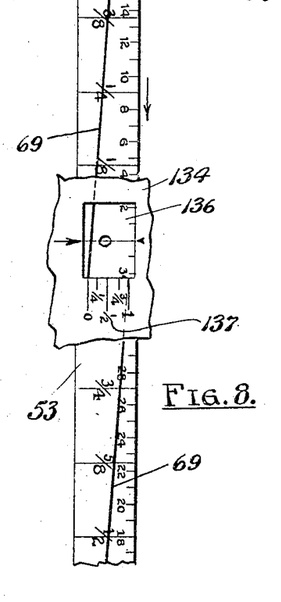
Fig. 8 is an enlarged fragmentary plan and development of the visual measure indicator seen by the operator of the machine.

An indicating member 62 (Fig. 6) is mounted between its ends on a hub 63 mounted on shaft 56 back of the plate 61. The lower arm thereof is bent forward at right angles, as indicated at 64 to pass through an arc shaped slot in plate 61, shown at 65, and terminates in a downwardly extending pointer 66 which passes over the face of the plate 61 below the slot. The upper end of the upper arm of member 62 is turned to the rear at right angles and fashioned into a pointer 67. A gear segment 68 is included in the structure of the member 62, as shown in Fig. 6, with which the pins 47, heretofore described, have driving engagement. It is evident that the member 62 is moved slowly back and forth with the rotation of shaft 40, being driven thereby at its relatively slow speed, the loose mount of the sleeve or hub 63 on shaft 56 permitting the rotation of the shaft 56 at its greater speed.

An indicating line 69 is printed or otherwise applied spirally around the indicating member 53, indicating figures are applied to the plate 61 below slot 65 for the pointer 66 to pass over, as indicated at 70, and an indicating dial showing fractional parts of a unit of measurement is made on the plate 61 for the hand 60 to pass over as shown at 71. The movement of the pointer is such that with every yard of goods passed through the machine the pointer is moved the distance from one indicating character on scale 70 to the next, while the fractional parts of each yard passed through the machine are indicated on the dial 71. These fractional parts may be also indicated in inches, and in practice the inches are indicated on the dial, being left off in illustration because of lack of space for showing.

Figure 5:
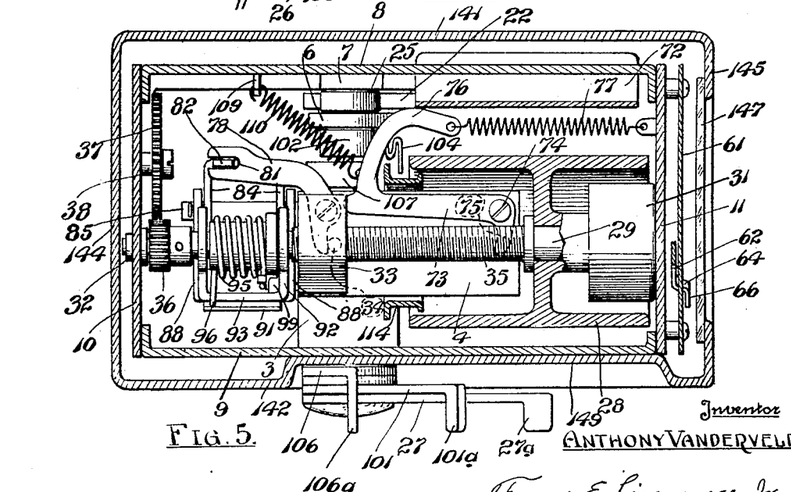
Fig. 5 is a longitudinal horizontal section taken through the lower part of the machine.

A brake plate or vane 72 (Figs. 10 and 13) is pivotally mounted on and depends from a suitable supporting arm 72ª projecting from the rear side plate 8, and normally, if free to do so, would lie against the goods passing over the member 20 to the rollers 12 and 28. An irregularly shaped member 73 (Figs. 5 and 9) lies above the arm 4 projecting from block 3 and is pivotally connected thereto adjacent its front end at 74, being formed with a short arm 75 at such end which passes over groove 5 and into the path of movement of the pin 34. At its free rear end the member 73 is formed with a rearwardly extending and curved cam arm 76 designed to come against a side of the vane 72 and turn it to the rear about its pivotal mount thereby raising the lower edge of the vane above the goods passing below, or to the dotted line position shown in Fig. 10. A spring 77, under tension normally draws said cam arm 76 against the vane and thus elevates it to inoperative position. When a predetermined amount of goods has been passed through between the two rollers 12 and 28, nut 33 has moved forward on the threaded part 35 of the arbor and brought pin 34 against the arm 75, turning the member 73 to the position shown in Fig. 9 and thereby freeing the braking vane 72 for movement to operative position, shown in full lines in Fig. 10, whereupon the any further drawing of the goods through the machine is stopped, the lower edge of the vane binding against the goods, as is obvious. Accordingly, the machine cannot be operated beyond the designed limit of its capacity of measuring and computing, a necessary feature as will be evident when the construction of the price computing scale and its operation is described.

A lever 78 (Figs. 5 and 9) is pivotally mounted at 79 substantially in alinement with the pivot 74 and at the rear portion and on the upper side of the block 3, having a finger 80 extending beyond the pivot over groove 5 and into the path of movement of the pin 34. This lever is turned to extend to the rear from the block 3, and at its end is slotted at 81 for the reception of an upwardly extending lug 82 (Figs. 4 and 11) which projects from the cross bar 83 of a metal U-shaped member, the arms 84 of which are bent from the ends of the cross bar and extend downwardly, having pivotal mount at their lower ends on a rod 85 which projects to the rear from the block 3. A spring 86 is connected at one end to bar 83 and at its opposite end to a second cross bar 87 of a second U-shaped member having downwardly bent legs 88 also pivotally mounted at their lower ends on the rod 85. Each of legs 88 at its front lower portion is formed with a foot 89 adapted to bear against the base 1, being normally held in engagement therewith through the action of a spring 90 connected to the bar 87 and the adjacent flange 2 (see Figs. 11 and 12). An upwardly and forwardly turned guide piece 91 is attached to the bar 87 as shown.

A third U-shaped member comprised of two legs 92 (Figs. 5 and 12) and a connecting bar 93 is loosely mounted on the arbor shaft 29, the bar 93 lying above the upper edge of the bar 87. A sleeve 94 lies between the ends of the legs 92 on the shaft 29 and is pinned thereto. A spring 95 is located around the sleeve 94, one end being formed into a hook 96 which engages over the upper edge of the bar 93 while the other end has a hooked connection with a pin 97 projecting from a shoulder part 98 formed at one end of the sleeve, the action of the spring being to turn the U-shaped member on the shaft 29 until stopped by the engagement of a lug 99 on the U-shaped member with the shoulder at 98.

Figure 9:
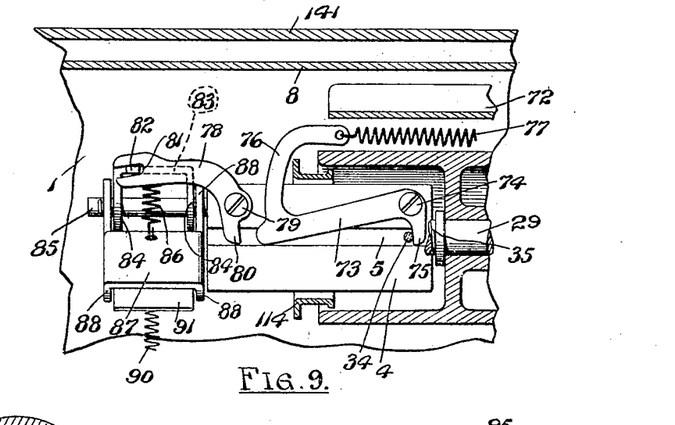
Fig. 9 is a fragmentary horizontal section through the machine and illustrating the mechanism used for applying the brake to the goods passed through the machine at the limit of its capacity, and the means used for taking the shock of stopping the machine when it is returned to initial position.
Figure 11:
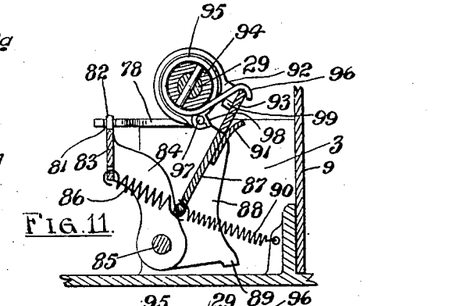
Figs. 11 and 12 are fragmentary vertical transverse sections through the shock taking mechanism, illustrating the same in different positions, the section being substantially on the plane of the line indicated at 11, in Fig. 4.
Figure 12:
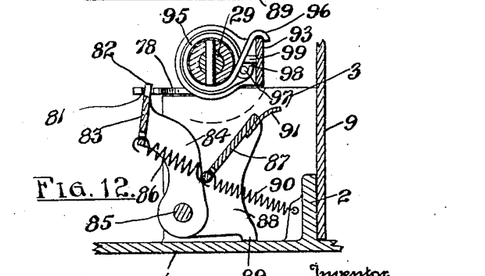

When the machine is being used and the goods, represented at A, drawn between the rollers 12 and 28, the rotation of shaft 29 causes the nut 33 to move toward the roller 28. After the measuring operation is completed, it is desirable that the nut and the rest of the mechanism shall return to initial position. The power for accomplishing this is supplied by the spring 42 which is a reservoir of energy received through its distortion during the progress of the measuring operation. When free to do so the spring 42 drives the mechanism in a reverse direction, the nut moving back toward the rear until the pin 34 strikes the projecting end 80 of the lever 78 (Fig. 9). It is evident that the sleeve 94, spring 95 and the U-shaped member mounted on shaft 29 turn with the shaft, the parts of the associated mechanism occupying the positions shown in Fig. 12. The pin 34 operates lever 78 so as to draw cross bar 83 to the position shown in Fig. 11, and as spring 86 is stronger than spring 90, the bar 87 is moved into the path of movement of the part 93, thereby stopping the movement of the U-shaped member on shaft 29 at once. This, however, does not abruptly stop the shaft 29 and connected measuring mechanism, as spring 95 yields to absorb the shock and permits a further rotative movement of the shaft and attached sleeve 94 as shown in Fig. 11, the shoulder at 98 moving away from the lug 99. The spring soon stops the mechanism and then returns the parts to normal position, there being successive smaller movements of the mechanism in both directions until it comes to a stop, which it does in a very short time, its final position being that shown in Fig. 18, the second and third U-shaped members described being together in engagement with bar 87 serving as a stop against bar 93 and with the shoulder 98 against lug 99, the mechanism always stopping at the same exact position in every case. The guide member 91 is to bring bars 87 and 93 properly together, as is obvious.

Figure 15:
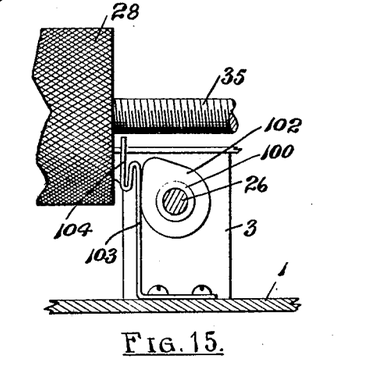
Fig. 15 is a similar view on the plane of line 15, of the same figure, both views being taken looking in the direction indicated by the arrows.
Figure 16:
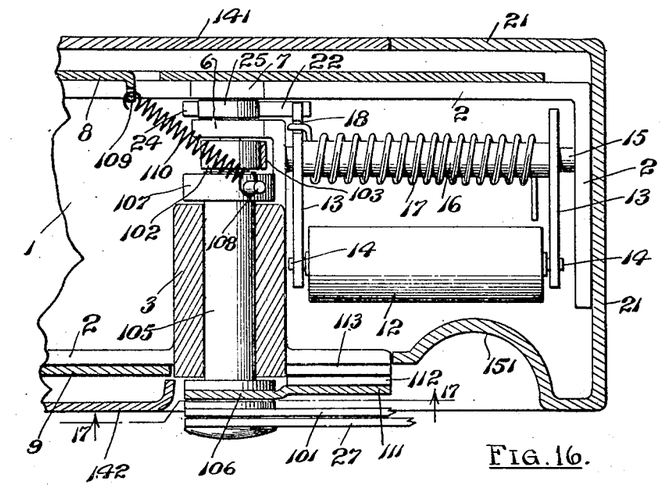
Fig. 16 is a fragmentary horizontal section through the lower front portion of the machine.

The shaft 26 (Fig. 13), heretofore described passes through a sleeve 100 which extends to the front of the machine and is equipped with an operating lever 101, the free end of which has an out-turned finger engaging portion 101ª. At its inner end a cam 102 is attached to the sleeve and bears against a spring bar 103 connected to and extending upwardly from the base 1. The upper end of the bar is formed into a reverse bend as indicated at 104 (Fig. 15). When a certain predetermined amount of the goods has been passed through the machine, the handle or lever 101 is operated to turn the cam 102 against the spring bar 103, thereby bringing the upper portion 104 against the end of the measuring roller 28, this acting as a brake to stop the mechanism from returning to original position until the brake is released.

Figures 1, 2:
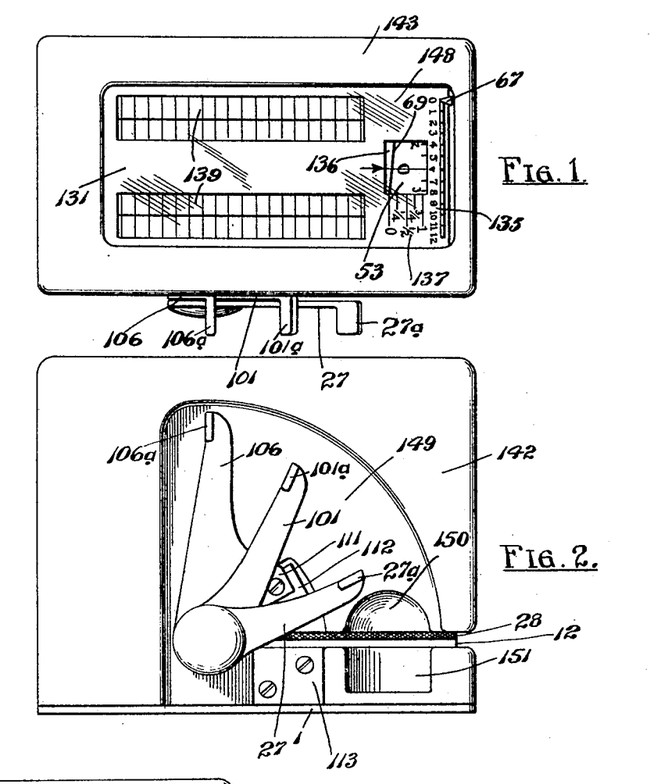
Fig. 1 is a plan of the machine.
Fig. 2 is a front side elevation thereof.
Figure 17:
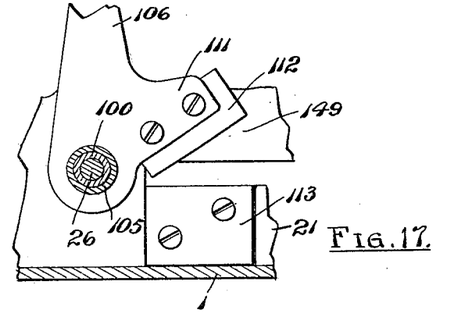
Fig. 17 is a fragmentary sectional view on the plane of line 17—17, of Fig. 16.

Sleeve 100 is mounted within another sleeve 105, it in turn being loosely mounted in and passing through the block 3. At its front end sleeve 105 has an operating handle or lever 106 likewise formed at its free end with a finger engaging portion 106ª. A ring 107 is attached to sleeve 105 at its inner end and has a pin 108 projecting therefrom, between which and a lug 109 struck from the rear side plate 8, a coiled spring under tension, shown at 110, is placed, the tendency of which is to always move the lever 106 to upper position, as shown in Figs. 2 and 17. Near its inner end, lever 106 is formed with an arm 111 to which a cutting blade 112 is secured, the same coacting with a second blade 113 attached to the front side 21 of the plate 20 to sever the goods A at its inner edge on depression of the lever, as is evident.

To prevent the entrance of threads, lint and the like into the rear end of the measuring roller 28, a guard ring 114 is placed at the rear open end of the roller having a substantially channel cross section around which the threads and lint may gather, and is attached to the block 3 in any suitable manner. The entrance of lint or threads is, however, not likely to occur in any case.

The construction so far described is capable of accurately measuring goods passed through between the measuring roller 28 and the presser roller 12 and indicating the amount of goods measured, and may be used for measuring only without additional mechanism substantially. It is desirable, however, to supply the machine with a coacting price computing mechanism. I have equipped the mechanism therewith, the construction of which will now be described.

Figure 22:
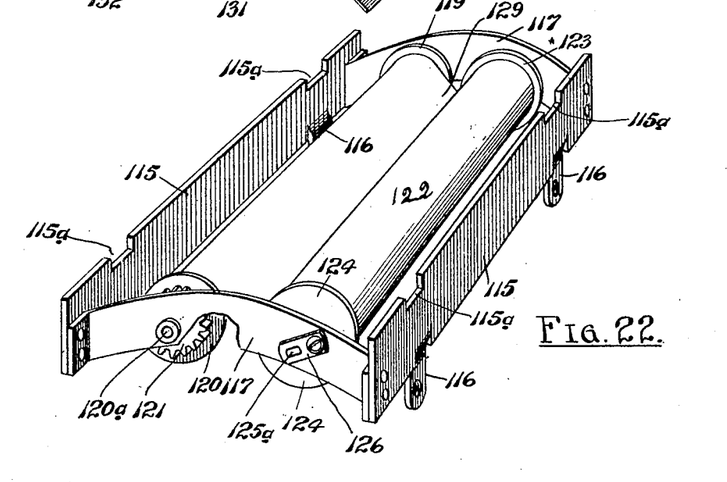
Fig. 22 is a perspective view of said price indicating mechanism.
Figure 23:
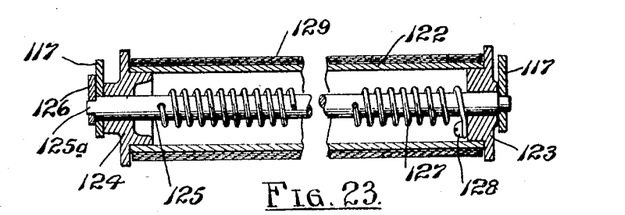
Fig. 23 is a longitudinal section through one of the rollers on which the price chart is wound.

A frame comprising front and rear side bars 115 from which attaching lugs 116 extend downwardly, and front and rear end bars 117 connected to and between the side bars is placed on and above the plates 8, 9, 10 and 11, lugs 116 passing alongside the plates 8 and 9 and being secured thereto by screws or like fastening devices. A hollow roller 118 having ends 119 and 120 is rotatably mounted on and between ends 117, pintles from the roller ends being passed through said ends 117, one of which is shown at 120ª in Fig. 22. A pinion 121 is connected to the end 120 of the roller. A second hollow roller 122 with ends 123 and 124 is mounted on a rod 125 carried by and between the frame ends 117. One end of the rod is formed substantially rectangular in cross section and enters a like opening in a clip 126 connected to one of the ends 117 whereby the rod is held from rotation. A spring 127 is attached at one end to the rod and at the other end to the end 123 of the roller, as indicated at 128. A chart 129 is connected at its ends to rods 130 located within the rollers (Fig. 13), the chart passing through slots in the rollers and normally winding on the roller 122 through winding action of the spring 127. As shown the chart passes from roller 118 to and in under roller 122. The chart is printed with characters indicating the prices of goods per unit of measurement, several prices for each of the different lengths indicated being printed as well as the computations for the different lengths at such prices.

A plate 131 of relatively thin sheet metal is located over the frame and rollers carried thereby, having downwardly directed front and rear side edge portions 132 from which lips 133 project and which are adapted to seat in notches 115ª in the upper edges of the sides 115 of the frame. At its front end the plate is extended and formed into an arc shape as shown at 134 over which the pointer 67 passes and a scale 135 is made thereon indicating yards measured as the pointer passes thereover. An opening 136 is made through the part 134 through which the characters on the member 53 are visible.

At one side of the opening a scale 137 is placed reading from zero to one with fractions between and in the turning of the member 53, the spiral line 69 thereon comes successively along the scale, permitting the operator to see the progress of measurement which is more or less impossible from direct inspection of the indicating characters on the member 53 on account of its movement.

Two parallel elongated openings 138 are cut through the plate 131, one above each roller 118 and 122 through which the characters on the chart 129 show. These characters are printed on both sides of the chart and those appearing through one opening 138 are but a succession to those appearing through the other. An elongated thin member 139 is attached to the under side of plate 131 adjacent each opening 138 and projects partially across the same, on which a series of numerals appear and relating to different prices which goods may have. If on one member 139, the prices begin, for instance at five cents and reach by different intervals to fifty cents, on the other member 139, the prices continue onward from said fifty cents upward, and the successive figures on the chart coming in line with those on the members 139 are multiples of the prices appearing on the members 139.

In the operation of the machine, the roller 118 (Fig. 13) is driven with the measuring mechanism, a gear 140 (Fig. 4) on the sleeve 51 on shaft 50 meshing with the pinion 121 on roller 118. whereby the chart is continuously wound from roller 122 on to roller 118 during the operation of the machine. The characters printed on the chart are so located, and the mechanism is so designed that when a certain amount of the goods has been measured through the machine, the characters on the chart appearing through the openings 138 are the same multiple of the unit price characters on the members 139. That is, if five yards was measured, the characters appearing visually on the chart would be five times those of the price characters per yard on members 139, permitting the operator to readily determine the value of the goods, knowing what the price per yard of the same is.

Figure 3:
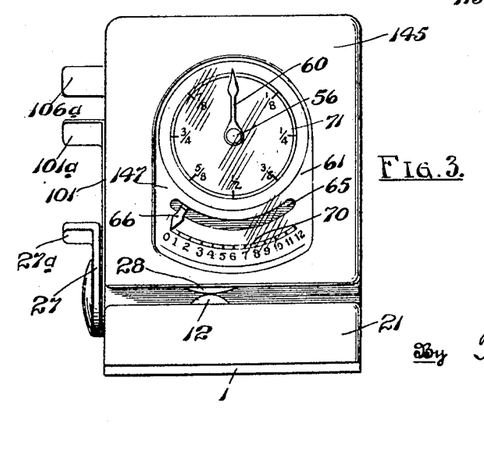
Fig. 3 is a front end elevation.

The entire mechanism described is covered by a sheet metal casing having rear and front sides 141 and 142, a tap 143, and rear and front ends 144 and 145, the latter of which extends nearly to the plate 20 and is turned inwardly a short distance above it as indicated at 146. The front end has a portion cut away sufficient to disclose the plate 61 on which dial 71 and scale 70 appear, the opening being filled by a glass 147 through which the same are visible. Likewise a large opening is cut in the top 143 and filled by glass 148, permitting the seeing of the indicating characters on the chart, on the members 139, on the member 53 through opening 136 and the two scales at 135 and 137. Figs. 1 and 3 best show the visibility of the different indicating characters. The front side 142 of the casing is formed with a rearwardly pressed inset 149 for setting the levers 27, 101 and 106 in as far as possible, and a further recess 150 is made in this recessed portion 149 at its lower part and directly over a recess 151 in the front depending flange 21 to the plate 20.

When the machine is in normal starting position, the pointers 66 and 67 point to zero on the scales 70 and 135 and the zero character comes to the center of the opening at 136, as shown in Figs. 1 and 3; also the hand 60 points to zero on dial 71. To operate, the lever 27 is moved to lower position, cam 25 (Figs. 13 and 14) thereupon operating lever 22 to move roller 12 away from the measuring roller 28, the cam staying in engagement with the finger 24 and holding the presser roller 12 in lower position. The end of the goods to be measured is then grasped between the thumb and first finger and carried to between the rollers 12 and 28, the recesses 150 and 151 accommodating the thumb and first finger for the positioning of the end of the goods at the exact point it should occupy for correct measurement. With another finger of the same hand, the operator may then turn lever 27 back toward upper position, releasing the roller 12 to press against the goods and firmly bring it against the measuring roller. The goods are then drawn through the machine, the measuring roller 28 being turned thereby and operating all of the measuring and computing mechanisms described. As this operation proceeds, hand 60 goes around the dial 71, making a complete revolution for each yard passed through the machine. The member 53 rotates, making a complete revolution for each yard passed and bringing its indicating characters indicating fractional parts of a yard to the opening 136. The pointers 66 and 67 move one space with each yard passed. It is evident that both the clerk operating the machine and the customer in front of the machine may see the progress of measurement and the final amount measured, the dial at 71 and scale at 70 being for the information of the customer while the clerk sees the scale at 135 and the fractional indications on member 53. This is a very valuable feature of the invention. When the desired amount has been measured, the clerk grasps lever 106 and moves it to lower position, at the same time and with the downward movement of said lever, also operating levers 101 and 27 downwardly. The cloth or other goods is severed at one edge by the knife on lever 106, the friction brake 104 (Fig. 15) against the end of roller 28 set and the presser roller moved and held away from the measuring roller with the operation of the levers. This frees the goods for removal from the machine and cutting across where notched or partially cut by the knife 112. The clerk by looking at the chart and noting the amount opposite the price of the goods, such yard price of the goods appearing on one of the members 139, then knows the price of the goods measured and cut off and what to charge the customer without the necessity of calculation. Lever 106 may then be raised to free the end of roller 28 from the brake, and permitting the mechanism to return to starting position with all indicators pointing to zero. The price chart is rolled on the roller 122 by the spring 127 as fast as roller 118 unwinds the chart in the reverse movement of the mechanism. The machine is then ready for a repetition of the operation, presser roller 12 being held separated from the measuring roller 28 and allowing the free passage of the goods between them for positioning the end of the goods for the next measuring operation.

This construction of measuring and computing machine is particularly practical and operative, having all necessary safeguards and being of relatively few parts compared with other machines designed to attain more or less the same result. As the length of the chart 129 is necessarily limited, the amount of goods which may be measured at one time must be likewise limited and insured against running over, this being the purpose served by the release of the vane 72. Undue shocks and strains to the moving parts of the mechanism are avoided by the rebounding action of the spring 95 (Figs. 11 and 12) and associated parts. The double indicating feature of both the yards and fractions of yards for clerk and customer is of especial merit. Many changes in detail of construction may be resorted to without departing from the invention defined in the appended claims, and I, accordingly, consider that I am entitled to all such forms or modifications as come within the scope of said claims.

I claim:

1. In a machine of the character described, means for measuring cloth or like material by drawing the same through the machine, a dial indicating fractions of yards located at and visible from one end of the machine, a scale to indicate yards likewise visible from the same end of the machine, a hand movable over the dial and operatively connected with the measuring means for rotation through one complete revolution with each yard passed through the machine, an indicating member visible from above the machine and also indicating fractions of a yard, means for driving the same by the measuring means through one revolution with each yard passed through the machine, a second scale indicating yards visible from above the machine, and a double pointed lever having its ends associated with and movable over the scales, and means for moving said lever from the measuring means to move its pointer ends from one scale indication to another on the said scales with each yard of material passed through the machine.

2. A cloth measuring machine having two scales thereon, each comprising a consecutive series of numbers indicating units of cloth measurement, one of said scales being located in a substantially horizontal plane and the other in a substantially vertical plane, measuring mechanism included in the machine through which cloth or like material may be drawn to operate said mechanism, indicating means movable over each of said scales, and means for driving said indicating means from the measuring mechanism as the cloth or like material is passed through the machine to move the said indicating means simultaneously and equally over both scales so as to pass from one indicating number to the next higher with each unit length of measurement of material passed through the machine.

3. A cloth measuring machine having two scales thereon each comprising a series of numbers indicating yards, one of said scales being located substantially horizontal and the other substantially vertical, a lever pivotally mounted between its ends and formed at its lower end with a pointer adapted to pass over the vertical scale and at its upper end with a horizontally turned pointer to pass over the horizontal scale, cloth engaging means included in the machine against which cloth or like material may be drawn to operate said pointer, and means for driving said lever by said means to move the same so that the pointers pass from one yard indication to the next higher indication with each yard of material passed through the machine.

4. In a machine of the class described, mechanism driven by passing cloth or like material through the machine, said mechanism including a shaft turned one revolution with each yard of material passed through the machine, a cylindrical member connected to and movable with the shaft, said member on its surface carrying indicating characters indicating fractions of a yard, a plate located over said member having an opening directly over the member, a second shaft driven by the first shaft at equal speed, a hand attached to said second shaft, and a dial having fraction indications thereon over which the end of the hand passes, substantially as described.

5. A cloth measuring machine comprising mechanism operable by drawing a length of cloth or like material through the machine, a yard scale and fractional dial scale located on the front side of the machine and visible from in front of the machine, said yard scale having a consecutive series of figures and the fractional scale a consecutive series of fractions around the same, a second yard scale located substantially horizontal at the upper side of the machine and visible from above and likewise including a consecutive series of figures, a plate on which said second yard scale is carried, said plate having an opening therethrough, a cylindrical member located below the opening and carrying a second fractional scale thereon, a hand movable around the dial, means for driving the hand and said cylindrical member from said measuring mechanism through one revolution with each yard of material drawn through the machine, a member formed with pointers at opposite ends to pass over the yard scales, said member being movably mounted, and means for moving said member from one yard indicating figure to the next higher figure with the passage of each yard of material through the machine.

6. A cloth measuring machine comprising a rotatably mounted measuring roller, a pivotally mounted frame mounted below the measuring roller, a presser roller carried by the frame directly under the measuring roller, spring means normally tending to elevate the presser roller and force it against the measuring roller, a pivotally mounted lever engaging at one end with an end of the frame, a shaft, means for turning the same manually, and a cam on the shaft for engaging with the other end of the lever to depress the roller and hold it in depressed position on turning the shaft in one direction.

7. A cloth measuring machine comprising a rotatably mounted measuring roller, measuring indicating mechanism driven by said roller, means normally tending to return the roller and associated mechanism to initial position after once moved from said position. a spring brake member located adjacent an end of the roller, a cam rotatably mounted and engaging against the spring brake member, and means for manually moving the cam to force the brake member against the end of the roller to thereby hold the roller and associated mechanism in any position to which it may be moved, substantially as described.

8. A cloth measuring machine comprising a rotatably mounted measuring roller, a pivotally mounted frame mounted below the measuring roller, a presser roller carried by the frame directly below the measuring roller, spring means normally tending to elevate the presser roller to force it against the measuring roller, a pivotally mounted lever engaging with the frame at one end thereof, a spring brake member located adjacent one end of the measuring roller, a rotatably mounted sleeve, a cam on the sleeve adapted to press the brake member against the measuring roller on rotation of the sleeve in one direction, a shaft rotatably mounted within the sleeve, a cam on the shaft adapted to engage with the other end of the lever to depress the presser roller on rotation of the shaft in the same direction, and operating handles on the sleeve and shaft for manually turning the same, substantially as described.

9. A construction containing the elements in combination defined in claim 9, combined with a second sleeve inside of which the first sleeve is rotatably mounted, an operating lever attached to the second sleeve adjacent the operating handles on the first sleeve and said shaft, and a cutting knife carried by said operating lever and operable to cut the goods passed through the machine at one edge on operation of the lever in one direction.

10. A construction containing the elements in combination defined in claim 9, combined with a second sleeve inside of which the first sleeve is rotatably mounted, an operating lever attached to the second sleeve adjacent the operating handles for the first sleeve and said shaft, a cutting knife carried by said lever, a coacting knife carried below the first knife by the machine, and spring means normally tending to hold the lever in upper position and serving to return the same to said position on release thereof after downward operation.

11. In a cloth measuring machine, measuring and presser rollers between which cloth or like material is passed for driving the measuring roller, a plate over which the material moves to said rollers, a vane pivotally mounted above said plate and normally tending to drop against the material passing over the plate, means for engaging against the vane to elevate it above said plate, and means automatically drawing said vane engaging means to inoperative position to allow the vane to drop after the measuring roller has turned a predetermined number of revolutions, substantially as described.

12. In a cloth measuring machine, measuring and presser rollers between which cloth or like material is passed for driving the measuring roller, measuring and indicating mechanism driven by said measuring roller including a threaded arbor shaft, a nut mounted on the shaft and traversing the same on rotation thereof, a plate over which the material passed to the rollers, a vane pivotally mounted above and depending toward the plate, a pivotally mounted member spring actuated to bear against the vane and swing it to a point above the plate, and a pin on the nut movable into engagement with said member to move the same to inoperative position and permit the vane to drop against the plate or goods passing thereover on operation of the machine a predetermined amount, thereby binding the material against further passage to the rollers.

13. In a cloth measuring machine, means for receiving cloth or like material to permit its drawing through the machine and operate the machine by frictional driving from the material, means for indicating the length of material passed through the machine, mechanism for driving said indicating mechanism, a price chart and means to drive the same in unison with the indicating mechanism, said chart carrying price computations bearing relation to the amount of material passed through the machine and indicated by the indicating means, and means to automatically engage against the material after a predetermined amount thereof has passed through the machine and stop further passage thereof, substantially as described.

14. In a cloth measuring machine, a measuring roller, means for pressing cloth or like material against the roller to thereby drive the roller on drawing the material over the same, indicating mechanism driven by said roller and indicating the length of material passed by the roller, and means for automatically engaging against the material after a predetermined length approaching the capacity of the machine to measure has passed by the roller and stopping further passage thereof by the roller, substantially as described.

15. In a cloth measuring machine, a measuring roller, an arbor shaft to which it is attached, a support located below the shaft, a nut threaded on the shaft and having a downwardly projecting pin thereon, said nut moving along the upper side of the support on rotation of the shaft, an irregularly shaped member pivotally mounted on the support a distance from the starting point of the nut, a presser roller bearing against the measuring roller, a plate over which cloth or like material passes to and between the rollers, a pivotally mounted vane depending toward the plate, said irregularly shaped member including a part adapted to lie against a side of the vane and also a part lying in the path of movement of the pin, and a spring attached to said member to draw it against the vane and normally raise its lower edge above the plate, said pin, after a predetermined operation of the machine, coming to the member and moving it to release the vane, substantially as described.

16. In a cloth measuring machine measuring mechanism adapted to be operated by frictional contact of cloth or like material with a part of the mechanism, said cloth being drawn thereby, spring means tensioned by operating the mechanism and tending to return the same to initial position when free to do so, means for stopping the mechanism at an exact and predetermined position, and means for yieldingly absorbing the shock of stopping said mechanism, substantially as described.

17. In a cloth measuring machine, a measuring roller against which the cloth or like material is pressed and drawn to drive the roller, measuring and indicating mechanism operated by the roller, a threaded shaft to which the roller is secured, a nut on the shaft and movable along the same during operation of the machine, spring means tensioned by operation of the mechanism for returning the same to initial position when free to do so, and means against which the nut engages on return to its initial position acting to position a stop against rotation of the shaft and connected mechanism in operative position, said stop including yielding means for absorbing the shock of stopping the mechanism, substantially as described.

18. In a machine of the class described, a measuring roller, a shaft to which said roller is attached having a threaded portion, mechanism operated by the shaft for indicating lengths of cloth or like material passed through the machine, said mechanism including a spring tensioned by operation of the machine and acting to return the mechanism to initial position when free to do so, a presser roller yieldingly engaging against the measuring roller, between which rollers the material is passed, a nut on the threaded portion of the shaft, a movably mounted stop member mounted adjacent the shaft and normally held in inoperative position when the machine is in operation, means operated by the nut on its return to initial position for moving the stop member to operative position, and cooperating stop means mounted on and rotatable with the shaft for engaging with the stop member to stop the mechanism at a predetermined and exact point on its return to initial position, said cooperating stop means including means for yieldingly absorbing the shock of stopping the mechanism.

19. In a machine of the class described, a measuring roller, a shaft to which said roller is attached having a threaded portion, a presser roller yieldingly engaging against the measuring roller, cloth or like material being drawn between the rollers to turn the measuring roller, mechanism operated by the shaft for indicating the length of material drawn through the machine, said mechanism including a spring tensioned by operation of the machine and acting to return the mechanism to initial position when free to do so, a stop member mounted on the shaft, a torsion spring attached at its ends to said stop member and shaft respectively, said shaft and stop member having interengaging projections for normally positioning the stop member in a fixed position to the shaft, a cooperating stop member movably mounted adjacent the shaft, a spring normally tending to move said cooperating stop member away from operative position, a nut on the shaft, means operated by the nut and connected to said cooperating stop member to move it to operative position on return of the nut to initial position thereby stopping the return movement of the mechanism, and said spring of the first stop member yielding to absorb the shock of stopping the mechanism and then returning it to an exact starting position, substantially as described.

20. A cloth measuring machine comprising a rotatably mounted measuring roller, measuring indicating mechanism driven by said roller, means tending to normally return the roller and associated mechanism to initial position after being moved from said position, a spring brake member for holding the mechanism in any position to which operated, a rotatably mounted cam engaging against said brake member, and means for moving the cam to force the brake member into engagement with the mechanism to releasably hold the same in any position to which it may be moved, substantially as described.

21. In a cloth measuring machine, mechanism adapted to be driven by passing cloth or like material through the machine, means normally tending to return said mechanism to initial position after it has been moved from such position, brake means for releasably holding the mechanism in any position to which moved, movable means for forcing the cloth into engagement with said mechanism whereby the movement of the cloth or like material will operate the mechanism, means for positioning said movable means to an inoperative position, a cloth cutting lever carrying a knife for cutting the cloth at one side, and two additional levers, one for manually operating the brake means and the other for operating said movable means mounted to turn on the same axis of rotation as the cloth cutting lever, whereby all of the levers may be operated either independently or simultaneously, substantially as described.

22. In a cloth measuring machine, a brake setting and releasing means, a cloth presser roller, means for moving said presser roller into operative or inoperative position, a cutting lever carrying a knife for slitting cloth at one edge, and two additional levers, one for manually operating the brake setting and releasing means and the other for controlling the presser roller moving means, all of said levers being mounted to turn about the same axis of rotation, substantially as described.

23. A cloth measuring machine having a scale thereon comprising a consecutive series of numbers indicating units of cloth measurement, measuring mechanism included in the machine through which cloth or like material may be drawn to operate said mechanism, indicating means movable over the scale, means for driving said indicating means from the measuring mechanism as cloth or like material is passed through the machine to thereby move said indicating means over the scale so as to pass from one number on the scale to the next higher number with each unit length of measurement of material passed through the machine, an additional means for indicating lengths of material passed through the machine, said additional means being located in a plane substantially at right angles to the plane of location of said scale and likewise serving to indicate lengths of cloth or like material passed through the machine, simultaneously and equally with the first means, and means for operating said additional means from the measuring mechanism, substantially as described.

In testimony whereof I affix my signature.

ANTHONY VANDERVELD.